(12) United States Patent
Kaligotla et al.

(10) Patent No.: US 12,598,158 B2
(45) Date of Patent: Apr. 7, 2026

(54) SYSTEMS AND METHODS FOR SECURING NETWORK TRAFFIC

(71) Applicant: Karthik Shourya Kaligotla, Frisco, TX (US)

(72) Inventors: Karthik Shourya Kaligotla, Frisco, TX (US); Arvin Reddy Jakkamreddy, Frisco, TX (US)

(73) Assignee: Karthik Kaligotla, Frisco, TX (US)

( * ) Notice: Subject to any disclaimer, the term of this patent is extended or adjusted under 35 U.S.C. 154(b) by 58 days.

(21) Appl. No.: 18/642,163

(22) Filed: Apr. 22, 2024

(65) Prior Publication Data

US 2024/0356895 A1     Oct. 24, 2024

Related U.S. Application Data

(60) Provisional application No. 63/460,710, filed on Apr. 20, 2023.

(51) Int. Cl.
H04L 9/40 (2022.01)

(52) U.S. Cl.
CPC ...... H04L 63/0236 (2013.01); H04L 63/0254 (2013.01); H04L 63/1433 (2013.01)

(58) Field of Classification Search
CPC ............. H04L 63/0236; H04L 63/0254; H04L 63/1433; H04L 63/1425
See application file for complete search history.

(56) References Cited

U.S. PATENT DOCUMENTS

| | | | | |
|---|---|---|---|---|
| 7,613,133 | B2 * | 11/2009 | Pullen | H04L 47/32 |
| | | | | 370/256 |
| 9,282,111 | B1 * | 3/2016 | Wei | H04L 63/0272 |
| 10,129,207 | B1 * | 11/2018 | Wan | H04L 61/2514 |
| 10,341,243 | B2 * | 7/2019 | Short | H04L 41/0896 |
| 11,418,487 | B2 * | 8/2022 | Moore | H04L 63/1466 |
| 11,516,242 | B2 * | 11/2022 | Mishra | H04L 47/20 |
| 11,714,674 | B2 * | 8/2023 | Forney | H04L 67/56 |
| | | | | 718/1 |
| 11,888,882 | B2 * | 1/2024 | Sheedy | H04L 63/1425 |
| 12,160,407 | B2 * | 12/2024 | Childers | H04L 63/0236 |
| 12,166,791 | B2 * | 12/2024 | St. Pierre | H04L 63/1458 |

* cited by examiner

*Primary Examiner* — Hosuk Song
(74) *Attorney, Agent, or Firm* — Outlier Patent Attorneys, PLLC

(57)     ABSTRACT

The present invention is for systems and methods for securing network traffic. An example method may comprise receiving, from an edge node for a network, a packet (original packet) from a first computing device addressed to a second computing device. The first computing device may be located inside the network. The second computing device may be located outside the network. Key information may be extracted from the original packet. The extracted key information may comprise an address associated with the first computing device, an address associated with the second computing device, etc. A new packet may be created with the extracted key information. The original packet may be discarded. Known safe information may be entered in a payload of the new packet. The new packet may be caused to be routed outside of the network, to the second computing device, as instructed by the original packet.

20 Claims, 8 Drawing Sheets

301 - receiving a plurality of packets

302 - filtering the packets to identify outbound packets

303 - redirecting outbound packets

304 - extracting packet information

305 - identifying packet type

306 - identifying a packet parameter

307 - generating a second packet having a safe payload

308 - transmitting the second packet

SYSTEMS AND METHODS FOR SECURING NETWORK TRAFFIC

CROSS-REFERENCE TO RELATED APPLICATIONS

This application claims the benefit of U.S. Provisional Application 63/460,710, filed Apr. 20, 2023 titled "SYSTEM AND METHOD FOR SECURING NETWORK TRAFFIC," which is herein incorporated by reference in its entirety.

BACKGROUND

Field of the Art

The systems and methods disclosed herein are related generally to network security and more specifically to sanitizing outgoing messages.

Discussion of the State of the Art

Data exfiltration involves unpermitted retrieval of data from computing devices in communication with a network. Data exfiltration may happen as a result of a data packet containing malicious instructions in its payload.

Many other products or services attempt to solve the problem of data exfiltration by either targeting the initial problem of malware or by classifying and discarding only detected malicious outbound activity. Attempting to keep out malware from an enterprise environment is a noble cause; however, this method remains susceptible to basic human error and hinges on the hope that malware remains outside of the network. For example, if a human gets successfully phished through a targeted email attack, the malware is already inside of the network and there is no special protection towards exfiltration of data. Furthermore, classifying and discarding data based on certain character- istics of packets may not be 100% accurate. As Artificial Intelligence models are typically used for the classification of these packets, and most AI models cannot claim 100% accuracy, there may be some data exfiltration packets that would be attributed to being a false negative and be mis- takenly allowed to leave the network. Furthermore, by having to run a classification algorithm on each packet that is traversing the network, there would be greater delays due to latency introduced to the network. This would mean that the network would become less efficient in terms of through- put from one place to another.

What is needed are systems and/or methods for securing network traffic that do not introduce big latency to the network and are not susceptible to vulnerabilities due to human and/or AI error.

SUMMARY

The present invention is for systems and methods for securing network traffic. An example method may comprise receiving, at an edge node for a network, a packet (original packet) from a first computing device addressed to a second computing device. The first computing device may be located within the network. The second computing device may be located outside of the network. The edge node may transmit the original packet to a server within the network. The server may extract key information from the original packet. The extracted key information may comprise an address associated with the first computing device, an address associated with the second computing device, etc. The server may create a new packet with the extracted key information. The server may discard the original packet. The server may enter known safe information in a payload of the new packet. The server may transmit the new packet to the edge node. The edge node may cause the new packet to be routed outside of the network, to the second computing device, as instructed by the original packet.

The methods and/or systems described in this disclosure protect sensitive data from being exfiltrated by malicious software (malware) through unauthorized means. The meth- ods and/or systems described in this disclosure recreate potentially dangerous packets with a known-to-be-safe pay- load before sending the packet to its previously intended destination.

The methods and/or systems described in this disclosure stop data exfiltration at a network level and generally serve as a utility which may be applied to a number of different protocols in the TCP/IP model. Data exfiltration is generally a component of malware attacks for the infected host to send data back to hackers.

The methods and/or systems described in this disclosure solve these problems by generating a new packet with a default payload so that any potentially malicious informa- tion in the originally transmitted packet is not sent to a destination computing device and nothing goes outside the network beyond what is authorized. Furthermore, to not disturb normal network operations with packets and ensure that data goes where it is supposed to go, certain key fields from the source packet such as the source and destination IP addresses are transferred to the new packet.

The methods and/or systems described in this disclosure regenerate each packet of a specific protocol that traverses the network rather than inspecting and classifying only the ones that are known to be malicious. Through this process, legitimate packets will not have their payload affected, whereas malicious packets will not be carrying malicious data. Furthermore, this will enable low program execution time and limit the latency delay that is added.

Most malware exfiltrate data by using outbound connec- tions of common TCP/IP protocols. These outbound proto- cols are typically not checked in enterprise settings allowing for ease of malware exfiltration for many hackers. The methods and/or systems described in this disclosure stop this form of covert channel data exfiltration through a multi-step process.

The methods and/or systems described in this disclosure may identify all network packets that are using a particular protocol. This may be done by using, for example, tcpdump, an open source packet sniffer commonly found in most Linux distributions. That said, any packet sniffer that may be used to identify the protocol of packets. In an example embodiment, an inline redirection model may be used. A server may contain program code. The server may receive the data outbound in relation to the network. By specifying particular options of the tcpdump command, the example embodiment may be able to filter through all of the other protocol-based packets and identify the target packets. The methods and/or systems described in this disclosure may narrow down the packet inspection by only looking through outbound packets. From here, the data that the packets carry may be transferred to a module, such as a Python script, in which the packet regeneration functionality is maintained.

In an example embodiment, a module, such as a Python script, may first identify key values that need to be main- tained in a regenerated packet. Next, the module may create a packet using identified key values as well as a known-tobe-safe default payload. After creating the packet, the module may send the new packet to an intended destination. The identified key values and the payload inserted in the new packet may differ based on the type of protocol that the packet was using.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
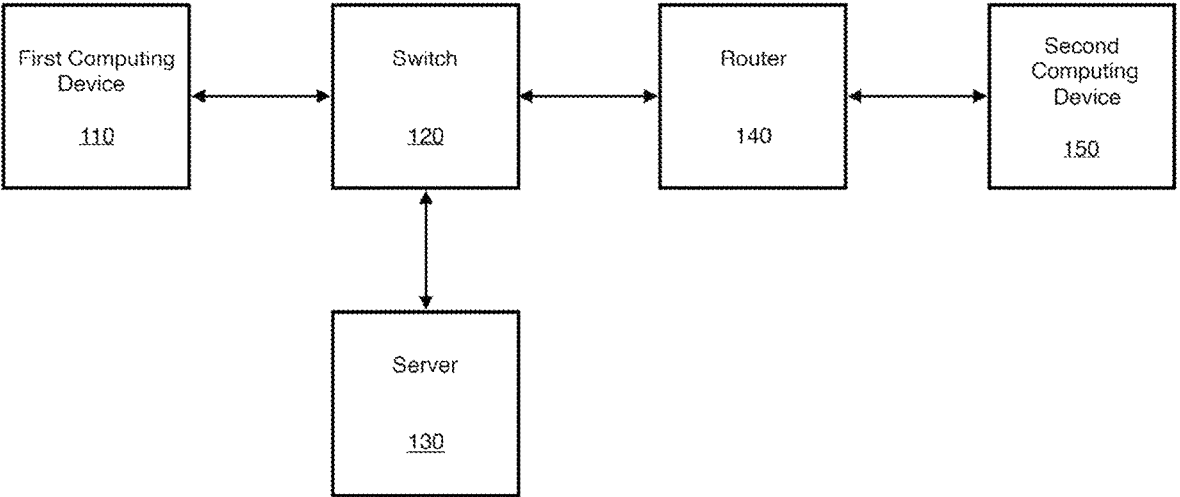
FIG. 1 illustrates a system for securing network traffic in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conceptual Architecture

FIG. 1 illustrates a system for securing network traffic in accordance with an exemplary embodiment of the invention. The system comprises a first computing device 110, a switch 120, a server 130, a router 140, and a second computing device 150. The first computing device 110 may be outside of a network. The switch 120 may be an edge node on the network. The server 130, the router 140, and the second computing device 150 may be within the network. The network may be an intranet, enterprise network, local area network (LAN), etc. The second computing device 150 may comprise sensitive information.

The first computing device 110 may create an Internet Control Message Protocol (ICMP) packet addressed to the second computing device 150. The ICMP packet may comprise tunneled data. The first computing device 110 may transmit the packet across a communication line where the packet may be received by the switch 120. The switch 120 may redirect the packet to the server 130. The server 130 may identify the packet as an ICMP packet (original packet) and generate a new ICMP packet (new packet). The new packet may comprise the same origination Internet Protocol (IP) address and destination IP address as the original packet. The new packet may comprise a payload known to be safe. The server 130 may forward the new packet to the switch 120. The switch 120 may forward the new packet to the router 140. The router 140 may forward the new packet to the second computing device 150. The second computing device 150 may process the new packet and create and transmit a reply. The router 140 may receive the reply and forward the reply to the switch 120. The switch 120 may redirect the reply to the server 130. The server 130 may identify the reply as an ICMP response packet (original response) and generate a new ICMP response packet (new response). The new response may comprise the same origination IP address and destination IP address as the original response. The new response may comprise a payload known to be safe. The server 130 may forward the new response to the switch 120. The switch 120 may forward the new response to the first computing device 110.

The first computing device 110 may comprise a user device. The second computing device 150 may comprise a user device.

The user device(s) may include, generally, a computer or computing device including functionality for communicating (e.g., remotely) over a network, such as the network hosting the switch 120, the server 130, the router 140, and the second computing device 150. Data may be collected from user devices, and data requests may be initiated from each user device. User device(s) may be a server, a desktop computer, a laptop computer, personal digital assistant (PDA), an in- or out-of-car navigation system, a smart phone or other cellular or mobile phone, or mobile gaming device, among other suitable computing devices. User devices may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network, such as the network hosting the switch 120, the server 130, the router 140, and the second computing device 150.

In particular embodiments, each user device may be an electronic device including hardware, software, or embedded logic components or a combination of two or more such components and capable of carrying out the appropriate functions implemented or supported by the user device. For example and without limitation, a user device may be a desktop computer system, a notebook computer system, a netbook computer system, a handheld electronic device, or a mobile telephone. The present disclosure contemplates any user device. A user device may enable a network user at the user device to access a network, such as the network hosting the switch 120, the server 130, the router 140, and the second computing device 150. A user device may enable its user to communicate with other users at other user devices.

A user device may have a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user device may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device one or more Hyper Text Markup Language (HTML) files responsive to the HTTP request. The user device may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device may also include an application that is loaded onto the user device. The application may obtain data from a network, such as the network hosting the switch 120, the server 130, the router 140, and the second computing device 150, and display the obtained data to a user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

The switch 120 may comprise any computing device used to direct network traffic. The switch 120 may be located at the edge of a network. Traffic flowing through the switch 120 may generally comprise packets originating from within the network and destined for a location outside the network or packets originating from outside the network and destined for a location inside the network. The switch 120 will be described in more detail in reference to FIG. 2.

The server 130 may comprise any computing device capable of storing and executing instructions. The server 130 may receive a first packet and create a second packet based on the first packet. The first packet may originate from within the network. The second packet may be transmitted outside of the network. The server 130 will be described in more detail in reference to FIG. 3.

The router 140 may comprise any computing device used to direct network traffic. The router 140 may be located within a network. Traffic flowing through the router 140 may comprise packets originating from within the network and/or destined for a location within the network.

Figure 2A:
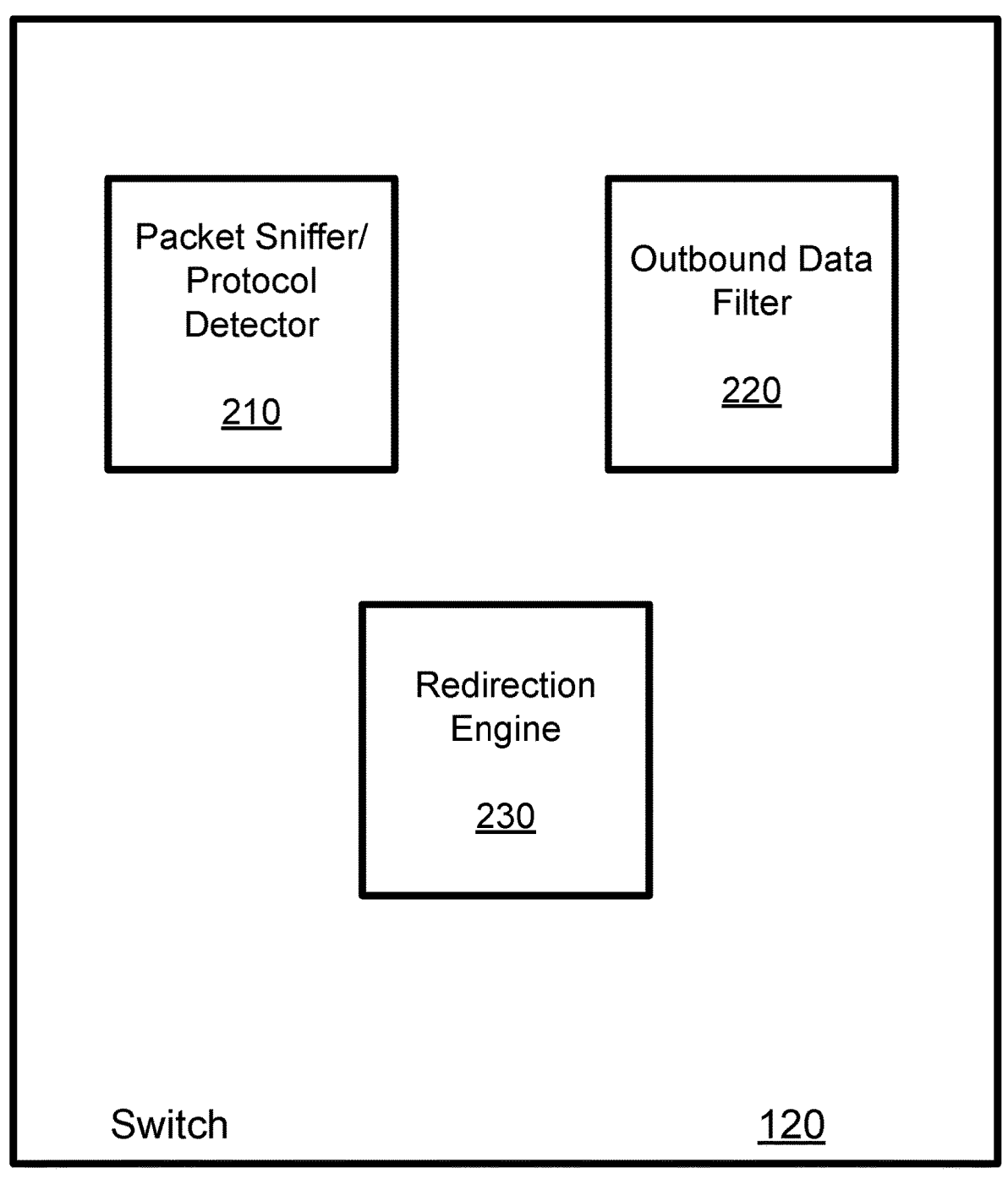
FIG. 2A illustrates an example switch in accordance with an exemplary embodiment of the present invention.
Figure 2B:
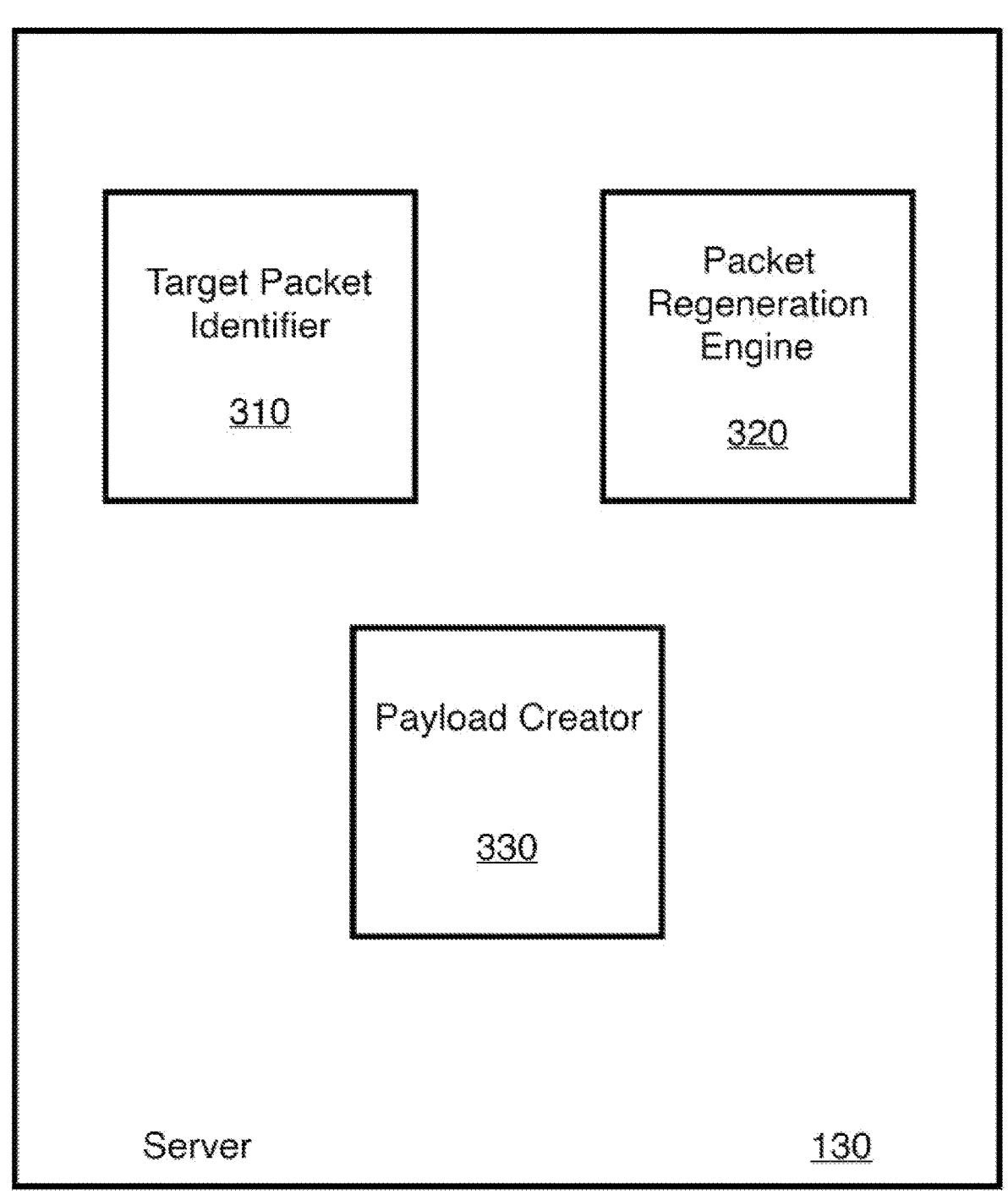
FIG. 2B illustrates an example server in accordance with an exemplary embodiment of the present invention.

FIG. 2 illustrates an example switch 120 in accordance with an exemplary embodiment of the present invention. The switch 120 may comprise a packet sniffer and/or protocol detector 210, an outbound data filter 220, and a redirection engine 230.

The packet sniffer and/or protocol detector 210 may determine a type associated with a packet. For example, packets of a particular protocol may allow for injection of malicious instructions in a payload. When the packet sniffer and/or protocol detector 210 detects a packet associated with a target type, the packet may be flagged for further processing. When the packet sniffer and/or protocol detector 210 detects a packet is not associated with a target type, the packet may be forwarded as usual.

The outbound data filter 220 may determine if a packet is outbound towards the network hosting the switch 120, the server 130, the router 140, and the second computing device 150. The outbound data filter 220 may determine that a packet is outbound if the packet comprises a destination Internet Protocol (IP) address outside of the network and an origination address inside the network. For example, the outbound data filter 220 may comprise a list of every IP address within the network, and may determine that a message is outbound if the destination IP address is not on the list and the origination IP address is on the list. When the outbound data filter 220 determines that a packet is outbound, the packet may be flagged for further processing. When the outbound data filter 220 determines that a packet is not outbound, the packet may be forwarded as usual.

The redirection engine 230 may cause outbound packets of particular types to be forwarded to the server 130. The redirection engine 230 may track packets forwarded to the server 130 so that response packets may also be forwarded to the server 130.

Figure 3:
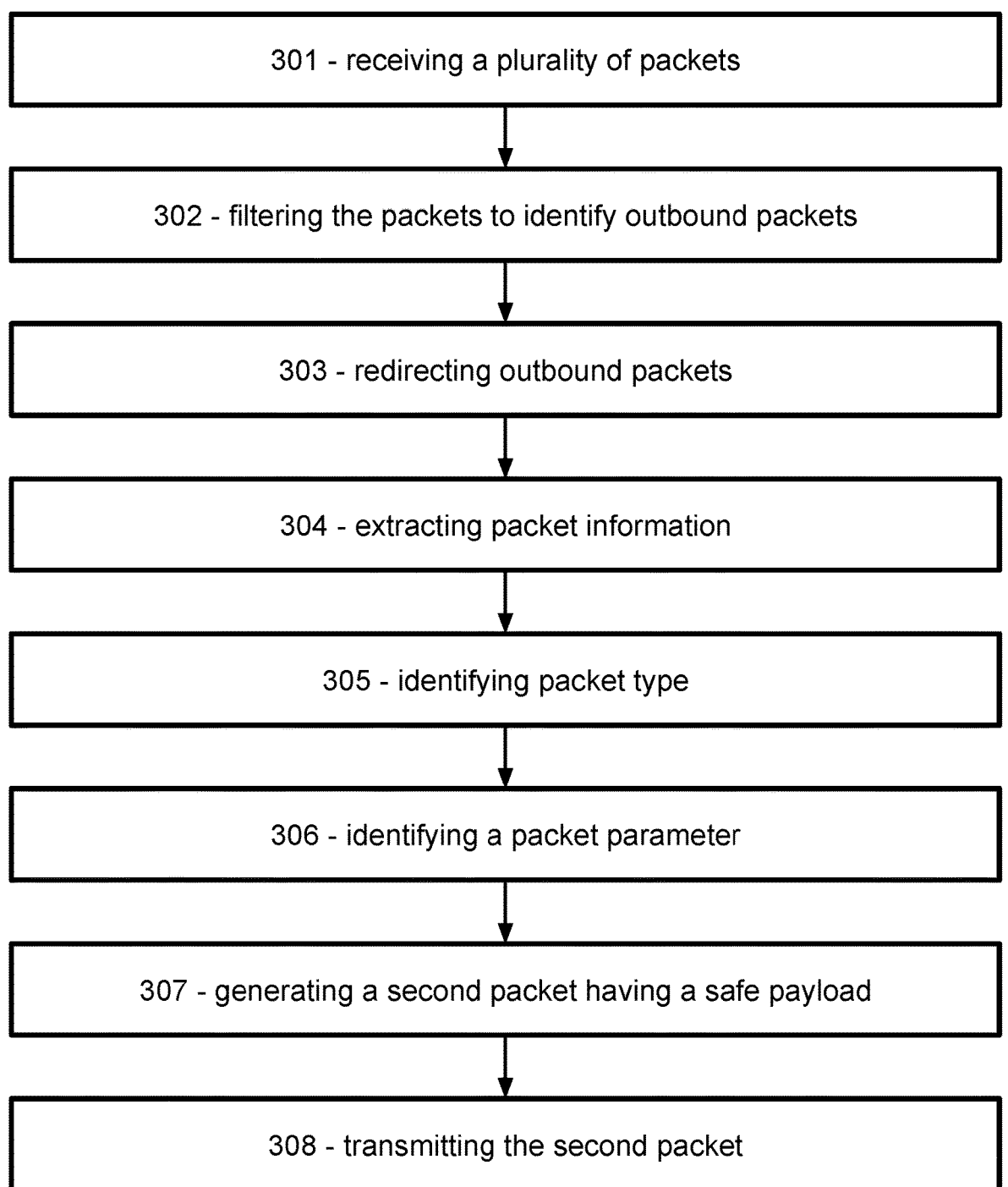
FIG. 3 illustrates an exemplary process for modifying data transmission in network packets in accordance with an exemplary embodiment of the present invention.

FIG. 3 illustrates an example server 130 in accordance with an exemplary embodiment of the present invention.

The server 130 may comprise a target packet identifier 310, a packet regeneration engine 320, and a payload creator 330.

The target packet identifier 310 may identify a type of packet. For example, if the packet is an Internet Control Message Protocol (ICMP) request packet, the target packet identifier 310 may identify the packet as an ICMP request packet. The target packet identifier 310 may identify key information from the packet, such as origination Internet Protocol (IP) address, destination IP address, etc. The target packet identifier 310 may forward information to the packet regeneration engine 320.

The packet regeneration engine 320 may create a new packet of type identified by the target packet identifier 310. The packet regeneration engine 320 may cause the new packet to comprise the key information identified by the target packet identifier 310.

The payload creator 330 may create a payload for the new packet. The new payload may be known to be safe.

FIG. 3 illustrates an exemplary process for modifying data transmission in network packets to reduce the likelihood of transmitting unwanted data according to one embodiment of the invention. The process comprises receiving a plurality of packets 301, filtering the packets to identify outbound packets 302, redirecting outbound packets 303, extracting packet information 304, identifying packet type 305, identifying a packet parameter 306, generating a second packet having a safe payload 307, and transmitting the second packet 308. The process steps described herein may be performed in association with a system such as that described in FIG. 1 and/or FIG. 2 above or in association with a different system. The process may comprise additional steps, fewer steps, and/or a different order of steps without departing from the scope of the invention as would be apparent to one of ordinary skill in the art.

At 301, the process comprises receiving a plurality of packets. Receiving packets may comprise receiving packets by a networking switch. The networking switch may be located within a local network. The switch may comprise at least one of a packet sniffer/protocol detector, outbound filter and redirection engine. Each packet may comprise a payload which may or may not be associated with malicious intent. In one aspect, receiving packets may comprise receiving encrypted packets (e.g. via an encryption session between the origination device and the server).

At 302, the process comprises filtering the packets to identify outbound packets. Filtering may comprise identifying outbound packets as packets being transmitted from a first computing device located inside a network (e.g. local network) to a second computing device located external to the network. Filtering may comprise flagging outbound packets for further processing. Filtering may comprise flagging outbound packets having certain characteristics for further processing, such as flagging outbound packets of a certain protocol type or having certain parameters. Filtering may comprise allowing internally transmitted packets (i.e. those remaining within the local network to be communicated normally or without being flagged for further processing. Filtering may comprise allowing certain outbound packets to continue along normal transmission routes without flagging or redirecting. Filtering may comprise classifying packets based on at least one packet property such as a protocol associated with the packet and/or control information associated with each packet. Classifying packets may comprise allocating a plurality of packets as belonging to a packet flow based on the packet property(ies).

At 303, the process comprises redirecting outbound packets. Redirecting outbound packets may comprise redirecting outbound packets may be redirected for further processing. Redirecting outbound packets may comprise redirecting flagged packets. Redirecting outbound packets may comprise redirecting packets via a switch to a server for further processing. The server may be located within a local network such that the packets can be modified prior to transmission outside of the local network. In one aspect, the server may decrypt encrypted packets so that further processing of the packets may be done. In one aspect, the server is configured with all unused external facing ports (i.e. logical ports as opposed to physical ports) open and forwards them to a singular internal port (i.e. a logical port) which scrutinizes incoming packets. This is merely one exemplary configuration of the logical port configuration and other configurations may be used without departing from the scope of the invention as would be apparent to one of ordinary skill in the art.

At 304, the process comprises extracting packet information. Extracting packet information may comprise extracting packet control information. Control information may comprise at least one of an origination Internet Protocol (IP) address and a destination IP address. Extracting packet information may comprise extracting packet control information for each outbound packet. Extracting packet information may comprise extracting packet control information for each flagged outbound packet.

At 305, the process comprises identifying packet type. Identifying a packet type may comprise identifying a protocol associated with each packet. Identifying a packet type may comprise identifying a protocol associated with each outbound and/or flagged packet. Identifying a packet type may comprise identifying at least one of port number(s) associated with the packet, a service associated with the packet, and a session associated with the packet.

At 306, the process comprises identifying a packet parameter. Identifying a packet parameter may comprise identifying at least one of a purpose and a format of the packet. Identifying a packet parameter may comprise identifying a parameter based on the packet type. For example, in the exemplary scenario discussed above of an ICMP packet, the parameter may comprise a type and/or code. In one aspect, the type and/or code can be used to identify the purpose of the packet, such as a type 0 packet which is known within ICMP to be an echo reply packet. This is merely one example of a packet parameter which could be used and is not intended to be limiting. Other packet parameters can be used to identify at least one of a purpose and a format of the packet as would be apparent to one of ordinary skill in the art.

At 307, the process comprises generating a second packet having a safe payload. Generating a second packet may comprise generating a second packet of the same type as the redirected packet. Generating a second packet may comprise generating a second packet for each redirected packet. Generating a second packet may comprise generating a second packet with the same control information as the redirected packet. Generating a second packet may comprise generating a second packet having the same purpose or parameter as the redirected packet (e.g. generating a second type 0 ICMP packet). Generating a second packet may comprise generating a second payload known to be safe. Generating a second packet may comprise generating a second payload without any consideration of the payload present in the redirected packet. In this way, each redirected packet can be, in essence, modified by regenerating a new packet with the same protocol, control information, and purpose as the original packet without replicating the payload which may or may not contain a malicious payload or sensitive content. Each redirected packet may be discarded without considering the payload thereby reducing (if not eliminating) the risk of a malicious payload or sensitive content being transmitted (e.g. to another computer outside of the network). In this way, packets comprising a malicious payload, but disguised as a normal packet would be regenerated without the malicious payload thereby reducing or possibly preventing malicious issues such as data exfiltration. Moreover, because each redirected or flagged packet is regenerated as a new second packet without analysis of the initial packet, the computational burden is reduced as compared to some conventional approaches. In other words, with the present invention, screening of packets to detect malicious content or malicious intent can be avoided since the payload of each packet will be generated as a known to be safe payload, thereby providing improved latency over approaches which screen packets for malicious intent.

At 308, the process comprises transmitting the second packet. Transmitting the packet may comprise transmitting the generated second packet (or regenerated packet) to the destination in accordance with the packet information (i.e. control information, protocol, etc.). In one aspect, transmitting the packet may comprise encrypting (or re-encrypting) the packet (e.g. via an encryption session between the server and the destination device). In one aspect, the server is operable to execute dynamic authentication handling (e.g. authentication protocol selection, challenging and completion) to enable authentication of encrypted packets being communicated between source and destination devices. In one aspect, transmitted packet data analytics may be recorded and/or reported. For example, for each redirected and/or regenerated packet transmitted by the process (or server), a database entry may be generated to record details associated with the packet. In one aspect, the database may be used to generate reports associated with packet regeneration activity. In one aspect, the packet data analytics may be provided to internal and/or external security devices, such as monitoring devices. In one aspect, the packet data analytics may comprise reporting potential security issues or vulnerabilities such as authentication failures. In one aspect, the packet data analytics may comprise reporting system health messages summarizing system performance over a given period of time (e.g. amount of packets processed in a given time, authentication failures, etc.).

As described above, the process may include encryption aspects. For illustration purposes, an exemplary flow of the encryption is outlined as follows. A source computer may send data (i.e. packets) via a first encryption session between a source computer and the processing server. The processing server may decrypt the data and perform the processing described above. The server may then send the resulting data (i.e. regenerated packets with known to be safe payload) to the destination computer via a second encryption session. In this example, each encryption session may use different encryption keys. In one aspect, the process maintains two simultaneous encryptions sessions in the form of a first between the source computer and server and a second between the server and the destination computer.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above mentioned systems, units, modules, engines, controllers, interfaces, components or the like may be and/or comprise hardware and/or software as described herein. For example, the first computing device 110, switch 120, server 130, router 140, and second computing device 150 in FIG. 1, and subcomponents thereof may be and/or comprise computing hardware and/or software as described herein in association with FIGS. 4-7. Furthermore, any of the above mentioned systems, units, modules, engines, controllers, interfaces, components or the like may use and/or comprise an application programming interface (API) for communicating with other systems units, modules, engines, controllers, interfaces, components, or the like for obtaining and/or providing data or information.

Figure 4:
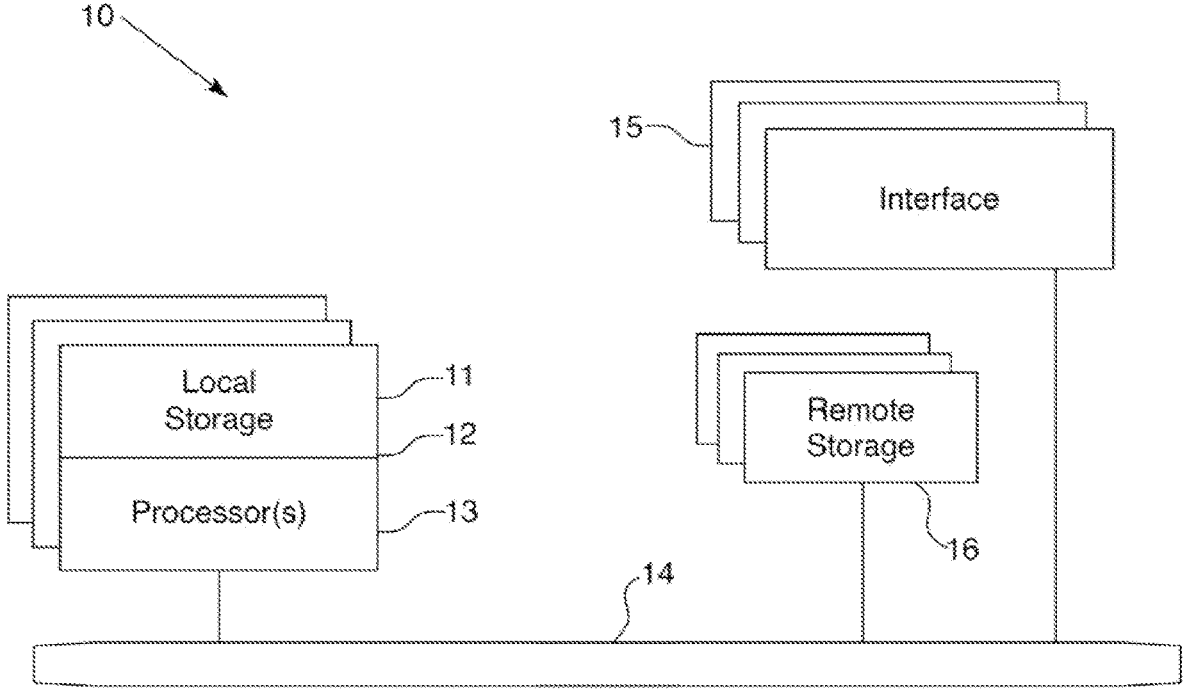
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
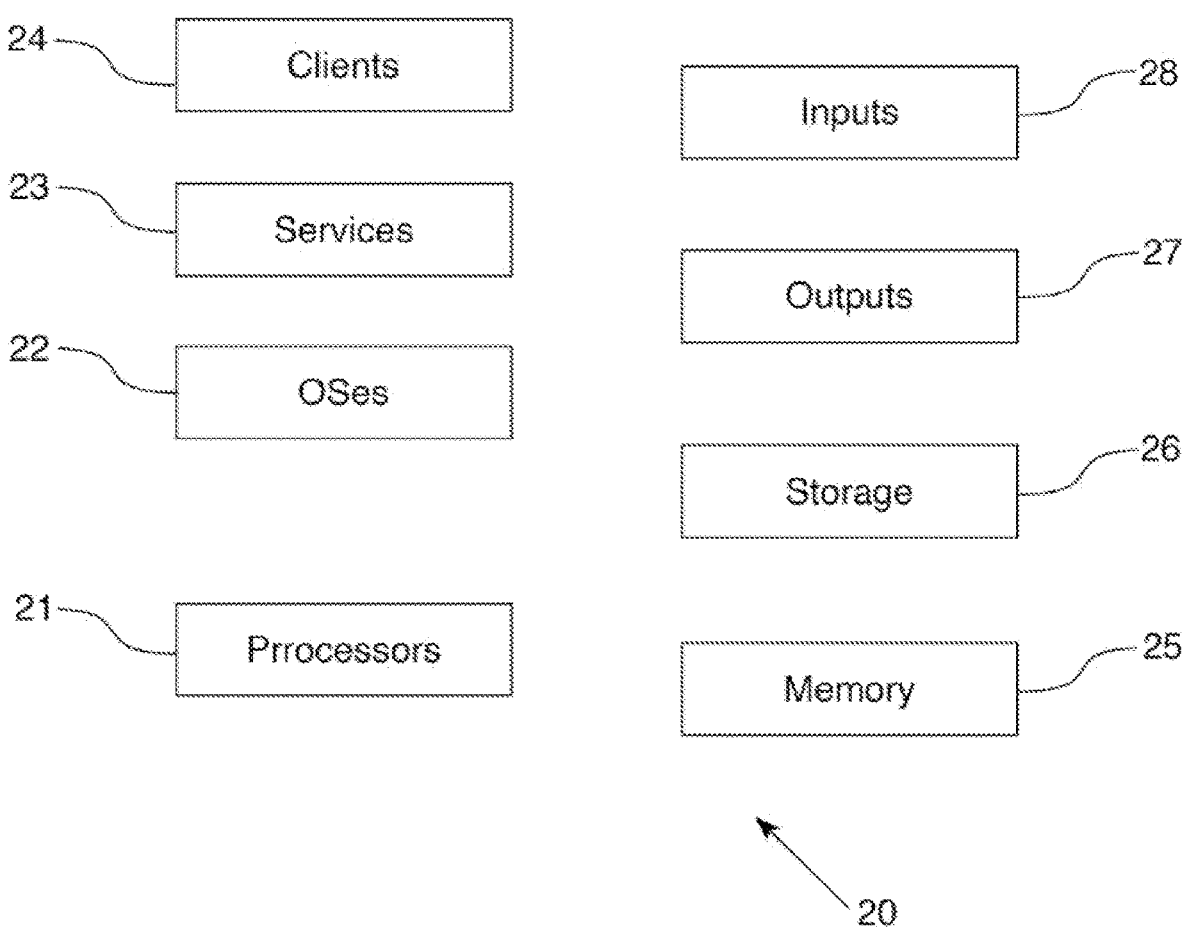
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
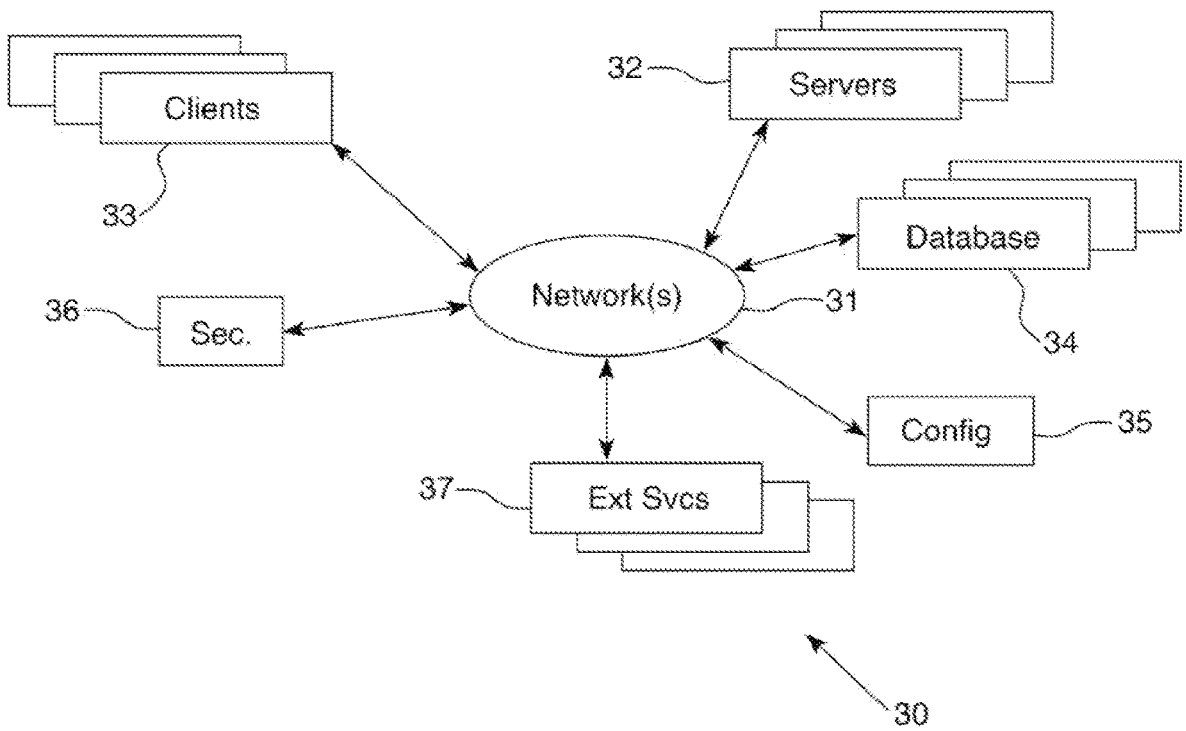
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
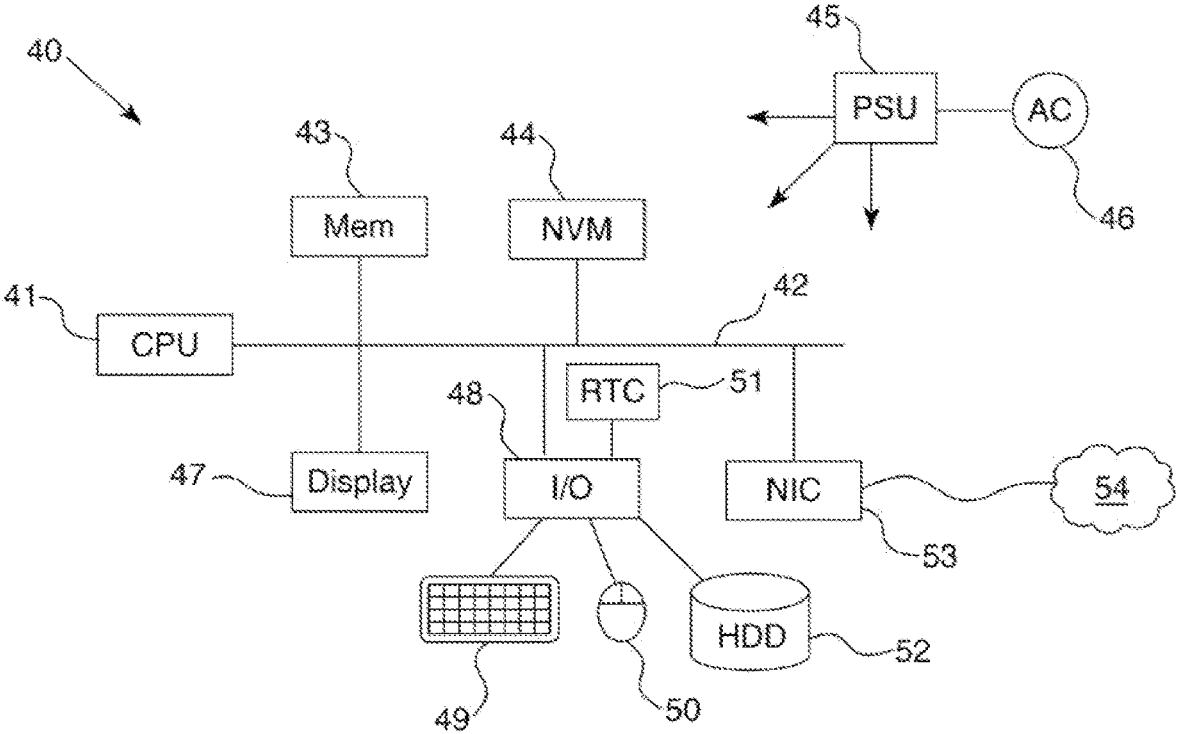
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for securing network traffic through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for altering data transmission in network packets to reduce the likelihood of transmitting unwanted data, the computer implemented method comprising:

receiving a plurality of packets;

filtering the packets to identify at least one outbound packet, the at least one outbound packet comprising a packet being transmitted from a first computing device to a second computing device, the first computing device located inside a network, the second computing device located external to the network, the outbound packet comprising a payload;

redirecting outbound packets to a server based on the filtering;

extracting outbound packet information from each redirected outbound packet, the extracted outbound packet information comprising at least packet control information;

identifying a packet type based on a protocol associated with each redirected outbound packet;

identifying a packet parameter associated with each redirected outbound packet based on the packet type;

generating a second packet for each redirected outbound packet, the second packet being of the same packet type as the redirected outbound packet and having the same packet control information, wherein generating the second packet comprises generating and storing a second payload known to be safe in the second packet, the second payload generated based on the packet parameter; and transmitting the second packet for routing to the second computing device in accordance with the packet control information.

2. The computer implemented method according to claim 1, wherein receiving a plurality of packets comprise receiving the packets by a switch located within a local network.

3. The computer implemented method according to claim 1, wherein filtering the packets comprises filtering the packets to identify at least one type of outbound packet and flagging packets of the corresponding at least one type for further processing.

4. The computer implemented method according to claim 1, wherein filtering the packets comprises filtering the packets to allow outbound packets of at least one type to continue along normal transmission routes without flagging or redirecting.

5. The computer implemented method according to claim 1, wherein filtering the packets comprises filtering the packets to identify each outbound packet and flagging each outbound packet for further processing.

6. The computer implemented method according to claim 1, wherein redirecting outbound packets comprises redirecting each outbound packet to a server.

7. The computer implemented method according to claim 1, wherein the server is located within a local network.

8. The computer implemented method according to claim 1, the packet control information comprising an origination Internet Protocol (IP) address and a destination IP address.

9. The computer implemented method according to claim 1, wherein the packet parameter is associated with at least one of a purpose and a format of the redirected outbound packet.

10. The computer implemented method according to claim 1, wherein filtering the packets comprises classifying packets based on at least one packet property, the packet property comprising at least one of packet protocol and packet control information.

11. The computer implemented method according to claim 10, wherein classifying packets comprises defining a plurality of packets belonging to a packet flow based on the at least one packet property.

12. A computing system for altering data transmission in network packets to reduce the likelihood of transmitting unwanted data, the computing system comprising:

at least one computing processor; and memory comprising instructions that, when executed by the at least one computing processor, enable the computing system to execute a method comprising:

receiving a plurality of packets;

filtering the packets to identify at least one outbound packet, the at least one outbound packet comprising a packet being transmitted from a first computing device to a second computing device, the first computing device located inside a network, the second computing device located external to the network, the outbound packet comprising a payload;

redirecting outbound packets to a server based on the filtering;

extracting outbound packet information from each redirected outbound packet, the extracted outbound packet information comprising at least packet control information;

identifying a packet type based on a protocol associated with each redirected outbound packet;

identifying a packet parameter associated with each redirected outbound packet based on the packet type;

generating a second packet for each redirected outbound packet, the second packet being of the same packet type as the redirected outbound packet and having the same packet control information, wherein generating the second packet comprises generating and storing a second payload known to be safe in the second packet, the second payload generated based on the packet parameter; and transmitting the second packet for routing to the second computing device in accordance with the packet control information.

13. The computing system according to claim 12, wherein receiving a plurality of packets comprise receiving the packets by a switch located within a local network.

14. The computing system according to claim 12, wherein filtering the packets comprises filtering the packets to identify at least one type of outbound packet and flagging packets of the corresponding at least one type for further processing.

15. The computing system according to claim 12, wherein redirecting outbound packets comprises redirecting each outbound packet to a server.

16. The computing system according to claim 12, the packet control information comprising an origination Internet Protocol (IP) address and a destination IP address.

17. The computing system according to claim 12, wherein the packet parameter is associated with at least one of a purpose and a format of the redirected outbound packet.

18. The computing system according to claim 12, wherein filtering the packets comprises classifying packets based on at least one packet property, the packet property comprising at least one of packet protocol and packet control information.

19. The computing system according to claim 18, wherein classifying packets comprises defining a plurality of packets belonging to a packet flow based on the at least one packet property.

20. A non-transitory computer readable medium comprising instructions that when executed by a processor enable the processor to execute a method for altering data transmission in network packets to reduce the likelihood of transmitting unwanted data, the method comprising:

receiving a plurality of packets;

filtering the packets to identify at least one outbound packet, the at least one outbound packet comprising a packet being transmitted from a first computing device to a second computing device, the first computing device located inside a network, the second computing device located external to the network, the outbound packet comprising a payload;

redirecting outbound packets to a server based on the filtering;

extracting outbound packet information from each redirected outbound packet, the extracted outbound packet information comprising at least packet control information;

identifying a packet type based on a protocol associated with each redirected outbound packet;

identifying a packet parameter associated with each redirected outbound packet based on the packet type;

generating a second packet for each redirected outbound packet, the second packet being of the same packet type as the redirected outbound packet and having the same packet control information, wherein generating the second packet comprises generating and storing a second payload known to be safe in the second packet, the second payload generated based on the packet parameter; and transmitting the second packet for routing to the second computing device in accordance with the packet control information.

* * * * *